(12) United States Patent
Chen et al.

(10) Patent No.: US 11,144,282 B2
(45) Date of Patent: Oct. 12, 2021

(54) MATHEMATICAL ACCELERATOR FOR ARTIFICIAL INTELLIGENCE APPLICATIONS

(71) Applicant: MediaTek Inc., Hsinchu (TW)

(72) Inventors: Yen-Yu Chen, Hsinchu (TW); Wei-Jen Chen, Hsinchu (TW); Yu Chia Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 117 days.

(21) Appl. No.: 16/731,527

(22) Filed: Dec. 31, 2019

(65) Prior Publication Data
US 2020/0225913 A1 Jul. 16, 2020

Related U.S. Application Data

(60) Provisional application No. 62/792,985, filed on Jan. 16, 2019.

(51) Int. Cl.
*G06F 7/548* (2006.01)
*G06F 7/556* (2006.01)
*G06F 7/483* (2006.01)
*G06F 9/30* (2018.01)

(52) U.S. Cl.
CPC .............. *G06F 7/556* (2013.01); *G06F 7/483* (2013.01); *G06F 7/548* (2013.01); *G06F 9/3001* (2013.01); *G06F 9/30036* (2013.01)

(58) Field of Classification Search
CPC ................................. G06F 7/548; G06F 7/556
See application file for complete search history.

(56) References Cited

U.S. PATENT DOCUMENTS

| | | |
|---|---|---|
| 10,175,980 B2 | 1/2019 | Temam et al. |
| 2018/0314928 A1 | 11/2018 | Li et al. |
| 2019/0004995 A1 | 1/2019 | Sankaralingam et al. |
| 2019/0102640 A1* | 4/2019 | Balasubramanian ........................ G06F 3/0656 |
| 2019/0369962 A1* | 12/2019 | Viswanathan Pillai ....................... G06F 7/544 |
| 2020/0185371 A1* | 6/2020 | Zhang .................. G06K 9/6217 |
| 2020/0226473 A1* | 7/2020 | Sharma .................. G06N 3/063 |

* cited by examiner

*Primary Examiner* — Chuong D Ngo
(74) *Attorney, Agent, or Firm* — Tong J. Lee

(57) ABSTRACT

A system includes an accelerator to accelerate the computations of nonlinear math functions. The accelerator includes a set of first evaluators and a set of second evaluators. Each of the first evaluators and the second evaluators is a fixed-function hardware circuit specialized for evaluating a respective nonlinear function. The system further includes a processor which decodes a math instruction in an instruction set, sends to the accelerator a signal identifying a nonlinear function corresponding to the math instruction, and receives an output of the nonlinear function from the accelerator. According to the signal, the accelerator evaluates the nonlinear function using one of the first evaluators. When the signal identifies the nonlinear function as a composite function, the accelerator additionally uses one of second evaluators on an output of the one first evaluator.

20 Claims, 5 Drawing Sheets

|  | Clock1 | Clock2 | Clock3 | Clock4 | Clock5 | Clock6 | Clock7 | Clock8 | Clock9 | Clock10 |
|---|---|---|---|---|---|---|---|---|---|---|
| Instr_0 | IF | ID | EX | MEM | WB | | | | | |
| Instr_M1 | IF | ID | EX | wait | wait | MEM | WB | | | |
| | | M_en | | f1 (1~5T) | | | M_out | | | |
| Instr_M2 | | IF | ID | EX | | | wait | | MEM | WB |
| | | | | M_en | | f2 (1~5T) | | g2 (1~5T) | | M_out |

Compound Instruction 400

MATHEMATICAL ACCELERATOR FOR ARTIFICIAL INTELLIGENCE APPLICATIONS

CROSS-REFERENCE TO RELATED APPLICATIONS

This application claims the benefit of U.S. Provisional Application No. 62/792,985 filed on Jan. 16, 2019, the entirety of which is incorporated by reference herein.

TECHNICAL FIELD

Embodiments of the invention relate to a processor and an accelerator for artificial intelligence (AI) computations.

BACKGROUND

Deep learning has gained wide acceptance for its superior performance in the fields of computer vision, speech recognition, natural language processing, bioinformatics, and the like. Deep learning is a branch of machine learning that uses artificial neural networks containing more than one hidden layer. The workload of neural network computations is intensive and often involves the evaluation of nonlinear functions.

For example, in feature extraction, neural network computations may include convolutions of input data with a set of filters, followed by nonlinear computations, down-sampling computations, and class scores computations. The nonlinear computations have been shown to be highly resource-demanding, and can cause long delays and high power consumption. Thus, there is a need for improvement in neural network computing to increase system performance.

SUMMARY

In one embodiment, a system is provided to accelerate nonlinear math computations. The system comprises an accelerator and a processor. The accelerator includes a set of first evaluators and a set of second evaluators. Each of the first evaluators and the second evaluators is a fixed-function hardware circuit specialized for evaluating a respective nonlinear function. The processor is operative to decode a math instruction in an instruction set, send to the accelerator a signal identifying a nonlinear function corresponding to the math instruction, and receive an output of the nonlinear function from the accelerator. The accelerator according to the signal is operative to evaluate the nonlinear function using one of the first evaluators. When the signal identifies the nonlinear function as a composite function, the accelerator additionally uses one of second evaluators on an output of the one first evaluator.

In another embodiment, a method performed by an accelerator is provided for accelerating nonlinear math computations. The method comprises: receiving, from a processor, a signal identifying a nonlinear function corresponding to a math instruction in an instruction set of the processor; evaluating, according to the signal, the nonlinear function using one of first evaluators, and, when the signal identifies the nonlinear function as a composite function, additionally using one of second evaluators on an output of the one first evaluator. Each of the first evaluators and the second evaluators is a fixed-function hardware circuit specialized for evaluating a respective nonlinear function. The method further comprises sending an output of the nonlinear function to the processor.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide an instruction set for a processor to support mathematical operations performed by a mathematical accelerator (also referred to as an accelerator). The instruction set includes mathematics ("math") instructions, which, when executed by the processor, cause the accelerator to evaluate, i.e., compute, math functions on an input value. The math functions include, but are not limited to, nonlinear functions typically used as activation functions in artificial intelligence (AI) computations such as artificial neural networks (ANNs). In one embodiment, each math function has a corresponding evaluation path in the accelerator for performing the corresponding math operations. Each evaluation path is composed of hardware circuitry specialized for the evaluation of a corresponding nonlinear math function.

Before describing the hardware architecture of the processor and the accelerator, it may be useful to describe some terminologies related to ANNs. An ANN may include multiple layers between the input layer and the output layer. Such a neural network is sometimes referred to as a deep learning neural network or a deep neural network (DNN). A DNN may include a combination of convolution layers, pooling layers, rectifier linear unit (ReLU) layers, fully-connected (FC) layers, softmax layers, etc. The computations performed in many of these layers include applying a nonlinear activation function to a set of data values. These functions may include, but are not limited to, an exponential function, a hyperbolic tangent function, a log function, a natural log function, a sigmoid function, a softmax function, etc. According to embodiments of the invention, when the processor decodes a math instruction, it sends a select signal with input parameters to the accelerator, where the select signal indicates a nonlinear function specified by or corresponding to the math instruction. The accelerator enables one or more evaluators to evaluate the nonlinear function, and sends the evaluation output to the processor for further processing.

Figure 1:
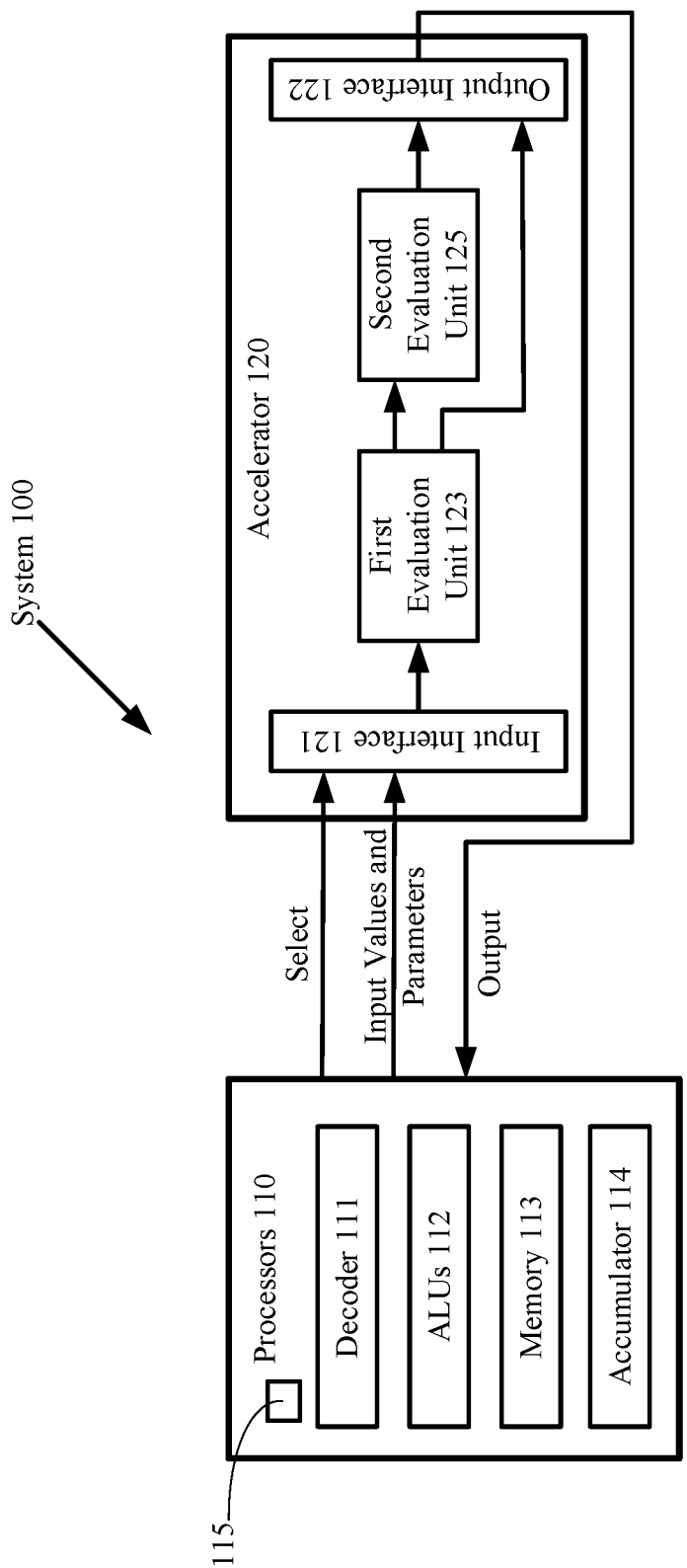
FIG. 1 illustrates a system for accelerated math function computations according to one embodiment.

FIG. 1 is a diagram illustrating a processor 110 coupled to an accelerator 120 according to one embodiment. The accelerator 120 includes hardware circuitry to accelerate nonlinear math computations. The instruction set of the processor 110 includes instructions executable by the processor 110, such as load, store, add, multiply, etc., and math instructions executable by the accelerator 120. In one embodiment, the processor 110 may also be referred to as a central processing unit (CPU), a core, or a processor core. The processor 110 may include a decoder 111, one or more arithmetic and logic units (ALUs), memory 113 and an accumulator 114 (e.g., an adder coupled to a register). The memory 113 may include volatile memory, non-volatile memory, or a combination of both. The memory 113 may store instructions defined in the instruction set.

In one embodiment, when the decoder 111 decodes a math instruction, it generates a select signal to the accelerator 120 to indicate the nonlinear function to be evaluated. The decoder 111 may look up a table 115, which associates each nonlinear function with an index identifying the nonlinear function and input parameters such as data format, data size, etc. In one embodiment, the table content may be synthesized into hardware circuitry that includes combinational logic multiplexers. The select signal sent to the accelerator 120 may include the index. The processor 110 also sends to the accelerator 120 the input value to the nonlinear function. The accelerator 120 then evaluates the nonlinear function and returns the output to the processor 110.

The accelerator 120 includes a first evaluation unit 123 and a second evaluation unit 125. The first evaluation unit 123 evaluates a first set of nonlinear functions, and the second evaluation unit 125 evaluates a second set of nonlinear functions. In one embodiment, the accelerator 120 further includes an input interface 121 and an output interface 122 to perform, among other operations, data conversion (e.g., conversion between an integer and a floating-point number) and bit-shifting operations. The data conversion ensures data compatibility between the processor 110 and the accelerator 120.

The first evaluation unit 123 has two alternative output paths: the first output path is coupled to the input of the second evaluation unit 125, and the second output path bypasses the second evaluation unit 125 to go to the output of the accelerator 120. When evaluating a composite function, the accelerator 120 enables the first output path. Otherwise, the accelerator 120 enables the second output path. In this disclosure, a composite function is defined as a composite of at least two nonlinear functions.

The system 100 may include additional hardware components not shown in FIG. 1 for simplicity of illustration. For example, the system 100 may include additional processors, such as additional CPUs, graphics processing units (GPUs), digital signal processors (DSPs), or other general-purpose and/or special-purpose processing circuitry. The system 100 may also include memory devices coupled to the processor 110, such as volatile and/or non-volatile memory devices such as dynamic random access memory (DRAM), flash memory, etc. The system 100 may also include network interfaces for connecting to networks (e.g., a personal area network, a local area network, a wide area network, etc.) and/or user interface devices such as a display, touch sensors, a camera, a microphone, a speaker, etc. The system 100 may be part of a computing device, a communication device, or a combination of computing and communication device. Examples of the system 100 may include, but are not limited to, a smartphone, a smart appliance, a gaming device, an infotainment device, an Internet-of-Things (IoT) device, etc.

Figure 2:
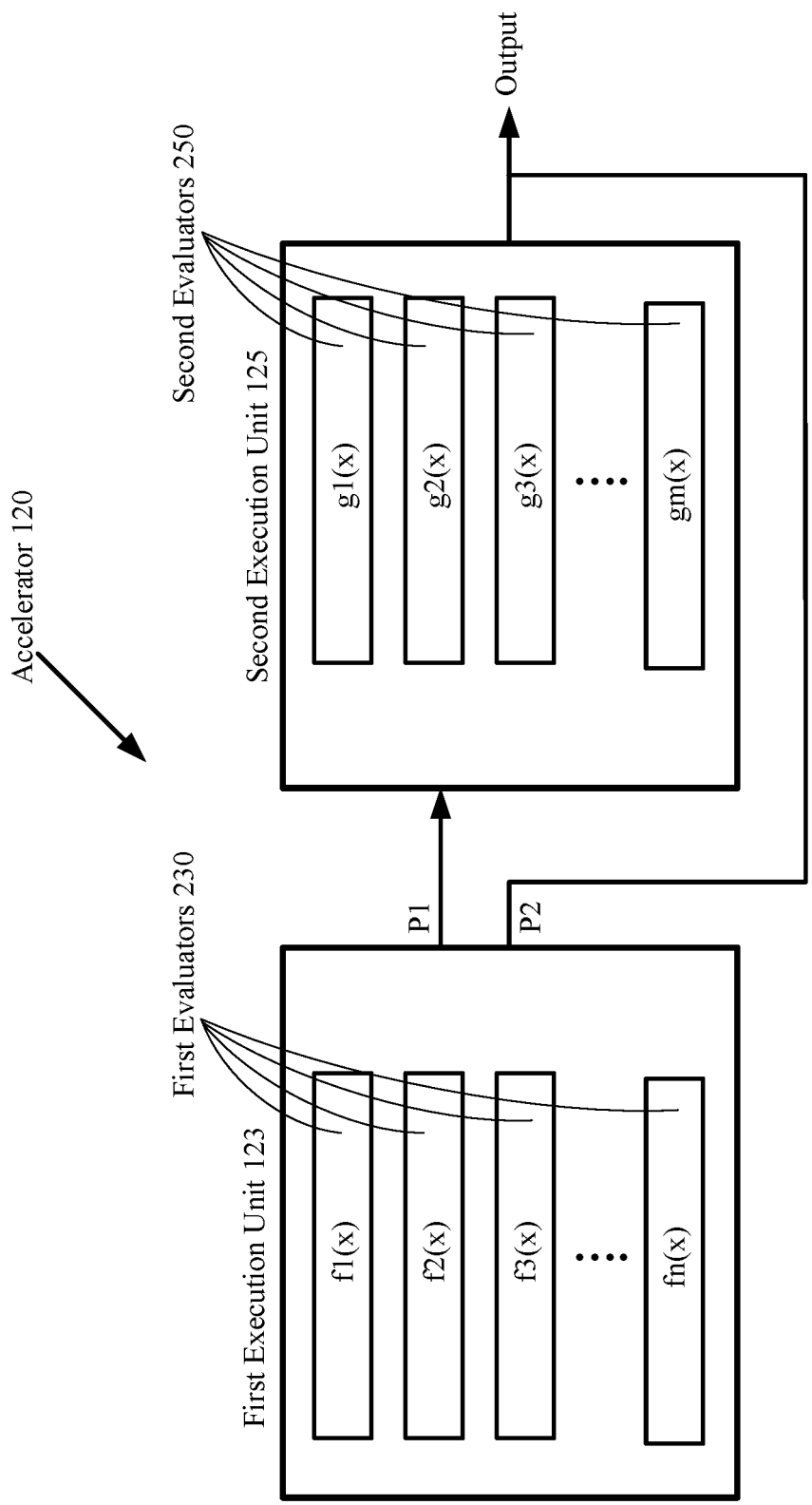
FIG. 2 illustrates some hardware circuitry in an accelerator according to one embodiment.

FIG. 2 is a diagram illustrating further details of the accelerator 120 according to one embodiment. The first evaluation unit 123 includes a set of first evaluators 230, each of which evaluates a nonlinear function. Each of the first evaluators 230 is a fixed-function hardware circuitry unit specialized for evaluating the corresponding nonlinear function. In addition to the first evaluators 230, the accelerator 120 also includes a set of second evaluators 250 in the second evaluation unit 125. The second evaluators 250 are used only when the accelerator 120 evaluates a composite function. Each of the second evaluators 250 evaluates a nonlinear function, where the input of the function is the output of one of the first evaluators 230. Each of the second evaluators 250 is a fixed-function hardware circuitry unit specialized for evaluating the corresponding nonlinear function.

For example, the first evaluation unit 123 may include n first evaluators 230 to evaluate the nonlinear functions $f1$, $f2, f3, \ldots, fn$, respectively, and the second evaluation unit 125 may include m second evaluators 250 to evaluate the nonlinear functions $g1, g2, g3, \ldots, gm$, respectively, where n and m can be any positive integer numbers. When the processor 110 sends an input value together with a select signal identifying a nonlinear function, the accelerator 120 in response enables one of the first evaluators 230, such as $fi$, where i is an integer in [1, n]. If the nonlinear function is a composite function, the accelerator 120 additionally enables one of the second evaluators 250 (e.g., gj), where j is an integer in [1, m]. Each of the first evaluators 230 and the second evaluators 250 is a fixed-function hardware circuit specialized for evaluating a respective nonlinear function. The output of the accelerator 120 is sent back to the processor 110.

Examples of the nonlinear functions $fi$ evaluated by the first evaluators 230 may include, but are not limited to, an exponential function, a logarithmic function, a reciprocal function, a trigonometric function, etc. For example, the nonlinear functions $fi$ may include, but are not limited to: $f1(x)=\ln(x)$; $f2(x)=e^x$;

$$f3(x) = \frac{1}{x};$$

$f4(x)=\log_2(x)$; $f5(x)=\cos(x)$; $f6(x)=\sin(x)$.

Examples of the nonlinear functions gj evaluated by the second evaluators 250 may include, but are not limited to, the following:

$$g1(x) = \frac{1}{(1+x)},$$

which in combination with $f2$ forms a sigmoid function $$g1(f2(-x)) = \frac{1}{(1+e^{-x})};$$

$$g2(x) = \frac{1-x}{1+x},$$

which in combination with $f2$ forms a hyperbolic tangent function $$g2(f2(-2x)) = \frac{(1-e^{-2x})}{(1+e^{-2x})};$$

$$g3(x) = \frac{x-1}{x+1},$$

which in combination with $f2$ forms another hyperbolic tangent function $$g3(f2(2x)) = \frac{(e^{2x}-1)}{(e^{2x}+1)};$$

$$g4(x) = \frac{x}{\ln 10},$$

which in combination with $f1$ forms a composite function $$g4(f1(x)) = \frac{\ln(x)}{\ln 10};$$

$$g5(x) = \frac{x}{\log_2 10},$$

which in combination with $f4$ forms a composite function $$g5(f4(x)) = \frac{\log_2(x)}{\log_2 10}.$$

It is noted that the nonlinear functions evaluated by the first evaluators 230 and the second evaluators 250 may include alternative forms of the functions described above, related functions (e.g., a hyperbolic cotangent function), and/or other nonlinear functions.

Figures 3, 4:
FIG. 3 illustrates pipeline operations performed by a processor and an accelerator according to one embodiment.
FIG. 4 illustrates a compound instruction format according to one embodiment.

FIG. 3 is a diagram illustrating pipeline operations performed by the processor 110 and the accelerator 120 according to one embodiment. This example shows the pipeline operations for three instructions (e.g., instr_0, instr_M1 and instr_M2). There are five pipeline stages in the operations of the processor 110, where the five stages are: instruction fetch (IF), instruction decode (ID), execution (EX), memory access (MEM) and write back (WB). In an alternative embodiment, the number of the processor's pipeline stages may be more, or fewer, than five. The first instruction, instr_0, is an instruction executed by the processor 110 (e.g., a load/store instruction, or an ALU instruction executed by the ALUs 112 in the processor 110). The second and third instructions are math instructions instr_M1 and instr_M2, respectively. In this example, instr_0 and instr_M1 are fetched and decoded in parallel. At the EX stage (clock 3), the processor 110 executes instr_0 using its internal hardware circuitry (e.g., by the ALUs 112), and enables the accelerator 120 (indicated by math_en) to execute $f1(x)$, which is the nonlinear function specified in instr_M1 with x being the input value to the function. The processor 110 then waits for the accelerator 120 to complete $f1(x)$, which typically takes one to five clock cycles. In this example, the accelerator 120 outputs the result at clock 7, and the processor 110 writes back the result.

The processor 110 may enable the accelerator 120 to evaluate two nonlinear functions in consecutive clock cycles. As an example, the processor 110 fetches and decodes the third instruction, instr_M2, one clock later than instr_0 and instr_M1. The processor 110 at the EX stage (clock 4) enables the accelerator 120 (indicated by math_en) to execute instr_M2. In this example, instr_M2 specifies a composite function which can be evaluated as $g2(f2(x))$, where x is the input value to the composite function. The accelerator 120 first evaluates $f2(x)$, and then evaluates $g2(f2(x))$. The evaluation of each of the functions $f2(x)$ and $g2(x)$ typically takes one to five clock cycles. At clock 10, the accelerator 120 outputs the result to the processor 110, and the processor 110 writes back the result.

From the example of FIG. 3, it is noted that the accelerator 120 performs pipelined operations on the nonlinear functions. For example, the accelerator 120 can evaluate $f1(x)$ and $f2(x)$ in overlapping clock cycles since the two functions are evaluated using different hardware circuitry (i.e., different first evaluators 230) that can therefore execute independently. In the above example, the accelerator 120 evaluates the second nonlinear function $f2(x)$ before completing the evaluation of the first nonlinear function $f1(x)$.

It is also noted from the example of FIG. 3 that the processor 110 may execute two (or more) instructions in parallel. FIG. 4 is a diagram illustrating a format of a compound instruction 400 in the instruction set of the processor 110 according to one embodiment. In this example, the compound instruction 400 includes three slots: Slot a, Slot b and Slot c. Each slot is occupied by one instruction, such as an instruction executable by the processor 110 or a math instruction specifying a nonlinear function. In alternative embodiments, a compound instruction may include any number of slots that is at least two. Regardless of the number of slots, one of the slots in a compound instruction may be a math instruction. In the example of FIG. 3, instr_0 and instr_M1 may be part of a compound instruction. When the processor 110 encounters a compound instruction, the processor 110 fetches and decodes all of the instructions in the slots of the compound instruction in parallel.

One of the nonlinear functions often used in AI computations is the softmax function. Softmax is a function that takes a vector of K real numbers as input, and normalizes the numbers into a probability distribution consisting of K probabilities. For an input vector of $[x_1, x_2, \ldots, x_K]$, the softmax function outputs a vector of K elements with each element denoted as:

$$\sigma(x)_i = \frac{e^{x_i}}{\sum_{j=1}^{K} e^{x_j}}$$

In one embodiment, the processor 110 in combination with the accelerator 120 may execute instructions for computing the softmax function. In one embodiment, the processor 110 may include the accumulator 114 for use in the calculation of the denominator (i.e., the sum of exponentials). The processor 110 may calculate the sum in a loop of K iterations, and in each iteration the processor 110 enables the accelerator 120 to evaluate one of the K exponential functions.

Figure 5:
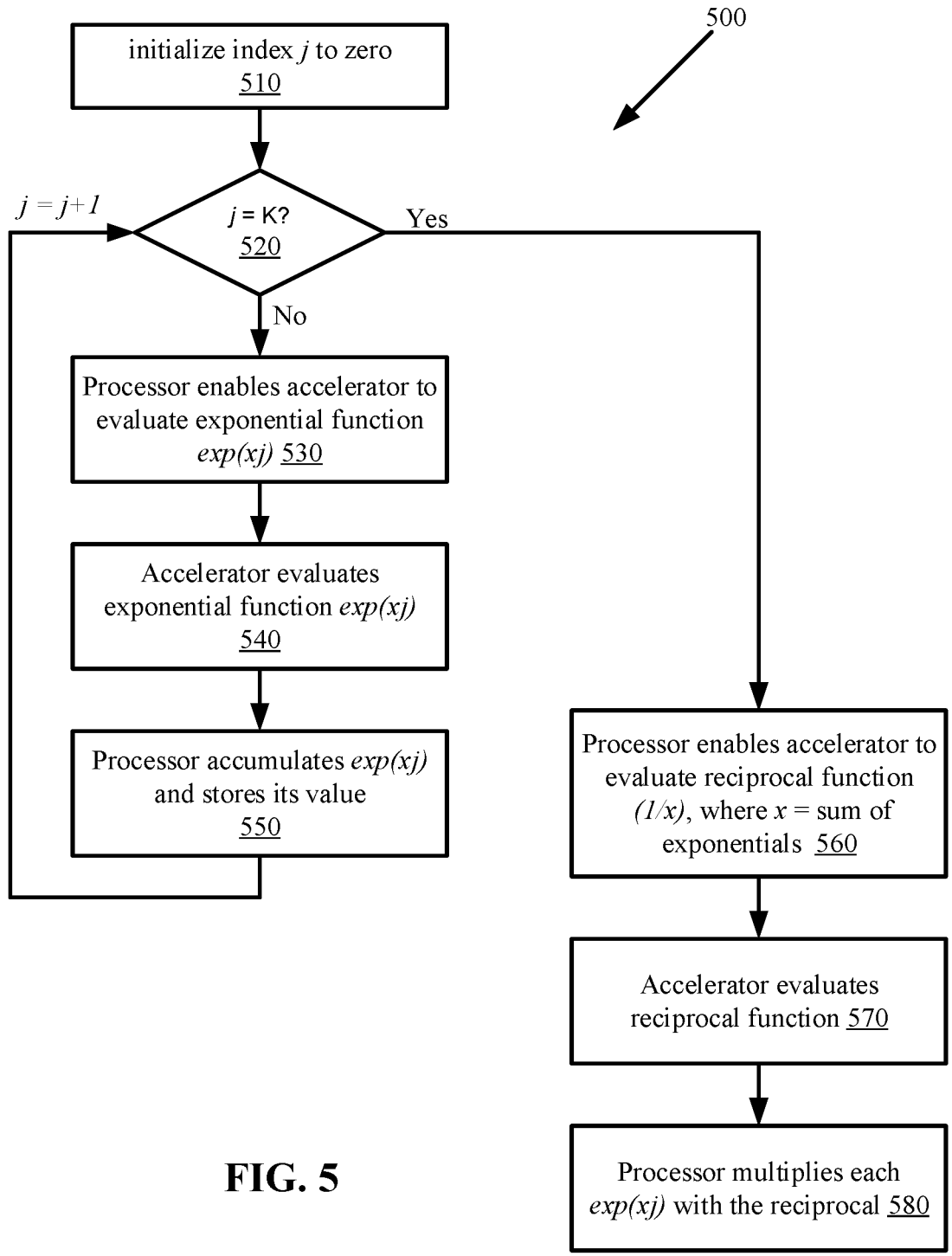
FIG. 5 is a flow diagram illustrating a method for evaluating a softmax function according to one embodiment.

FIG. 5 is a flow diagram illustrating a process 500 for evaluating the aforementioned softmax function according to one embodiment. The process 500 begins when the processor 110 enters a loop in which the loop index j is initialized to zero at step 510. When the index j has not reached K (step 520), the processor 110 in each iteration (step 530) enables the accelerator 120 to evaluate the exponential function $f2(x)=e^{x_j}$ (denoted in FIG. 5 as exp (xj)). The accelerator 120 evaluates the exponential function and outputs the result to the processor 110 at step 540. Referring also to FIG. 1, the processor 110 at step 550 accumulates the output of the exponential function using the accumulator 114, and stores the value of each exponential in the memory 113. The iterations proceed with an incremented j value. When the loop terminates (i.e., when j=K), the processor 110 at step 560 enables the accelerator 120 to compute the reciprocal of the accumulated result (i.e., the sum of exponentials), and the accelerator 120 at step 570 evaluates the reciprocal; e.g., by evaluating $$f3(x) = \frac{1}{x},$$

where x is equal to the sum of exponentials. At step 580, the processor 110 multiplies the output of the reciprocal function with each previously-computed exponential to obtain a corresponding element of the softmax output.

The example of FIG. 5 shows that the accelerator 120 can save a substantial amount of time by speeding up the evaluation of a nonlinear function; e.g., from tens or hundreds of clocks cycles to 1~5 clock cycles on average. In particular, when the evaluation involves a large number of iterations, the time savings can significantly improve system performance.

In one embodiment, a non-transitory computer-readable medium stores thereon instructions that, when executed by the processor 110 in the system 100, cause the system 100 to perform the process 500 of FIG. 5.

Figure 6:
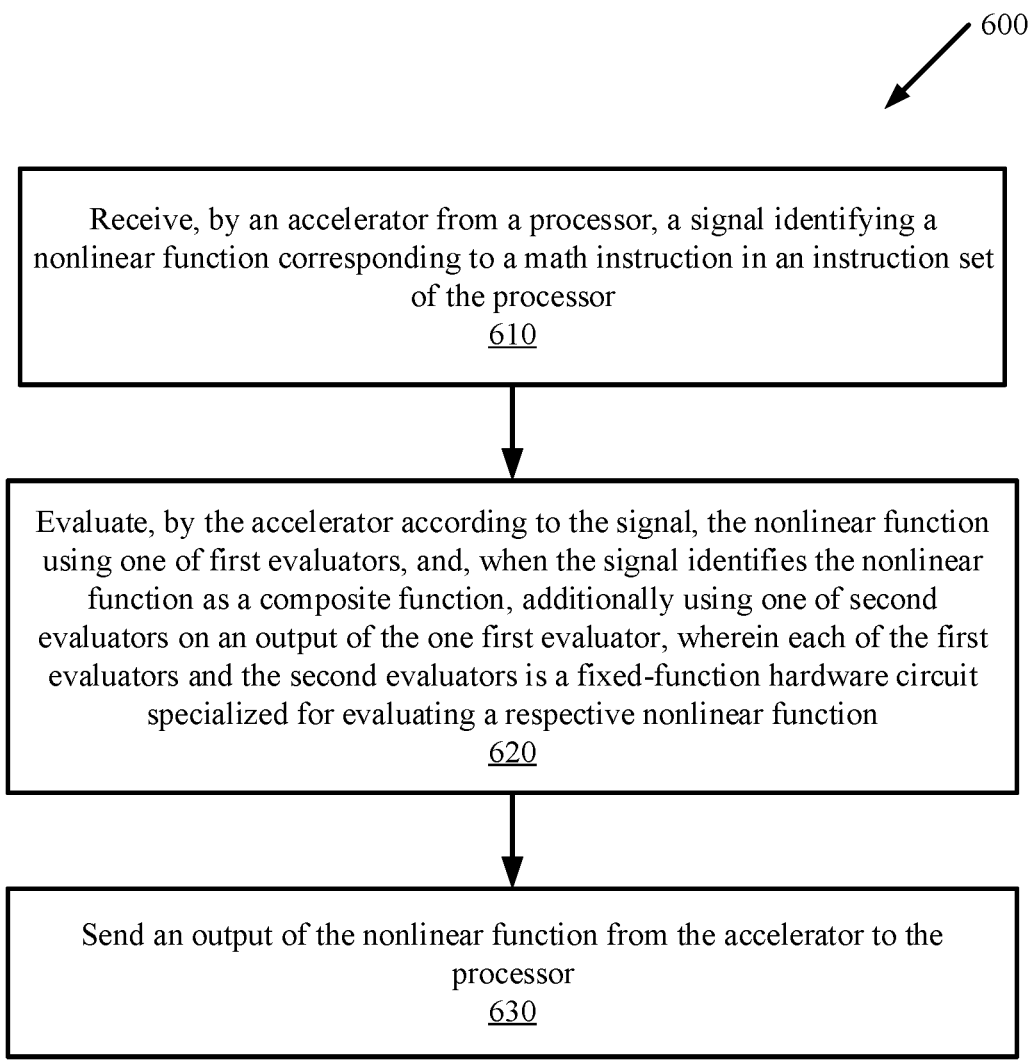
FIG. 6 is a flow diagram illustrating a method for accelerated math function computations according to one embodiment.

FIG. 6 is a flow diagram illustrating a method 600 for accelerating nonlinear math computations according to one embodiment. In one embodiment, the method 600 may be performed by the accelerator 120 in FIG. 1 and FIG. 2.

The method 600 begins with the accelerator at step 610 receives, from a processor, a signal identifying a nonlinear function corresponding to a math instruction in an instruction set of the processor. An example of the processor is the processor 110 in FIG. 1. The accelerator at step 620 evaluates, according to the signal, the nonlinear function using one of first evaluators (e.g., the first evaluators 230 in FIG. 2). When the signal identifies the nonlinear function as a composite function, the accelerator evaluates the nonlinear function by additionally using one of second evaluators (e.g., the second evaluators 250 in FIG. 2) on an output of the one first evaluator. Each of the first evaluators and the second evaluators is a fixed-function hardware circuit specialized for evaluating a respective nonlinear function. The hardware circuit typically comprises transistors. The accelerator at step 630 sends an output of the nonlinear function to the processor.

The operations of the flow diagrams of FIGS. 5 and 6 have been described with reference to the exemplary embodiments of FIGS. 1 and 2. However, it should be understood that the operations of the flow diagrams of FIGS. 5 and 6 can be performed by embodiments of the invention other than the embodiments discussed with reference to FIGS. 1 and 2, and the embodiments discussed with reference to FIGS. 1 and 2 can perform operations different than those discussed with reference to the flow diagrams. While the flow diagrams of FIGS. 5 and 6 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system operable to accelerate nonlinear math computations, comprising:

an accelerator including a set of first evaluators and a set of second evaluators, wherein each of the first evaluators and the second evaluators is a fixed-function hardware circuit specialized for evaluating a respective nonlinear function; and a processor coupled to the accelerator, the processor operative to decode a math instruction in an instruction set, send to the accelerator a signal identifying a nonlinear function corresponding to the math instruction, and receive an output of the nonlinear function from the accelerator, wherein the accelerator according to the signal is operative to evaluate the nonlinear function using one of the first evaluators, and, when the signal identifies the nonlinear function as a composite function, additionally using one of second evaluators on an output of the one first evaluator.

2. The system of claim 1, wherein the instruction set includes at least a compound instruction that specifies the math instruction and one or more instructions executable by the processor, and wherein the processor is operative to decode the math instruction and the one or more instructions in the compound instruction in parallel.

3. The system of claim 1, wherein the accelerator includes a plurality of pipeline stages to evaluate a second nonlinear function before completing evaluation of a first nonlinear function.

4. The system of claim 3, wherein the processor includes a plurality of pipeline stages to enable the accelerator to evaluate the first nonlinear function and the second nonlinear function in consecutive clock cycles.

5. The system of claim 1, wherein the accelerator includes a first evaluator unit which further includes the set of first evaluators, and a second evaluator unit which further includes the set of second evaluators, and
wherein the first evaluator unit has a first output path coupled to an input of the second evaluator unit, and a second output path bypassing the second evaluator unit.

6. The system of claim 1, wherein the processor further comprises an accumulator to accumulate a nonlinear function output from the accelerator over a plurality of iterations.

7. The system of claim 6, wherein the processor is operative to execute instructions to compute a softmax function using the accumulated nonlinear function output.

8. The system of claim 1, wherein the instruction set includes math instructions specifying composite functions, and wherein each composite function is a composite of at least two nonlinear functions.

9. The system of claim 8, wherein the composite functions include at least a sigmoid function and a hyperbolic tangent function.

10. The system of claim 1, wherein the first evaluators are operative to evaluate nonlinear functions which include at least an exponential function, a logarithmic function, a reciprocal function, and a trigonometric function.

11. The system of claim 1, wherein the processor further includes a memory to store a lookup table which associates the nonlinear function with an index identifying the nonlinear function and input parameters to be sent with the signal to the accelerator.

12. The system of claim 1, wherein the accelerator further includes an input interface and an output interface to convert an input data format and an output data format, respectively.

13. A method for accelerating nonlinear math computations, comprising:
receiving, by an accelerator from a processor, a signal identifying a nonlinear function corresponding to a math instruction in an instruction set of the processor;
evaluating, by the accelerator according to the signal, the nonlinear function using one of first evaluators, and, when the signal identifies the nonlinear function as a composite function, additionally using one of second evaluators on an output of the one first evaluator, wherein each of the first evaluators and the second evaluators is a fixed-function hardware circuit specialized for evaluating a respective nonlinear function; and
sending an output of the nonlinear function from the accelerator to the processor.

14. The method of claim 13, wherein the instruction set includes at least a compound instruction that specifies the math instruction and one or more instructions executable by the processor, and wherein the processor is operative to decode the math instruction and the one or more instructions in the compound instruction in parallel.

15. The method of claim 13, further comprising:
evaluating, by the accelerator, a first nonlinear function and a second nonlinear function in a plurality of pipeline stages, wherein the second nonlinear function is evaluated before completing evaluation of the first nonlinear function.

16. The method of claim 13, wherein the accelerator includes a first evaluator unit which further includes the first evaluators, and a second evaluator unit which further includes the second evaluators, and wherein the method further comprises:
selecting, by the accelerator according to the signal, an output path of the first evaluator unit between a first path coupled to an input of the second evaluator unit, and a second path bypassing the second evaluator unit.

17. The method of claim 13, wherein the instruction set includes math instructions which, when executed by the processor, cause the processor to accumulate a nonlinear function output from the accelerator over a plurality of iterations and to compute a softmax function using the accumulated nonlinear function output.

18. The method of claim 13, wherein the instruction set includes math instructions specifying composite functions, and wherein each composite function is a composite of at least two nonlinear functions.

19. The method of claim 18, wherein the composite functions include at least a sigmoid function and a hyperbolic tangent function.

20. The method of claim 13, wherein evaluating the nonlinear function using one of first evaluators further comprises:
evaluating the nonlinear function which is one of: an exponential function, a logarithmic function, a reciprocal function, and a trigonometric function.

* * * * *